May 15, 1956  C. L. REESE ET AL  2,745,252
EMERGENCY VALVE CYLINDER FOR HYDRAULIC BRAKE SYSTEMS
Filed July 30, 1954
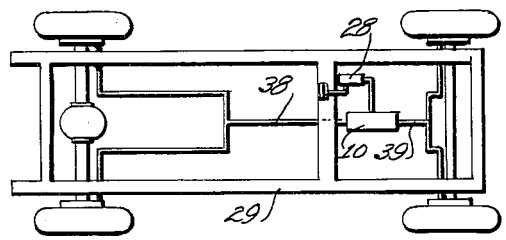
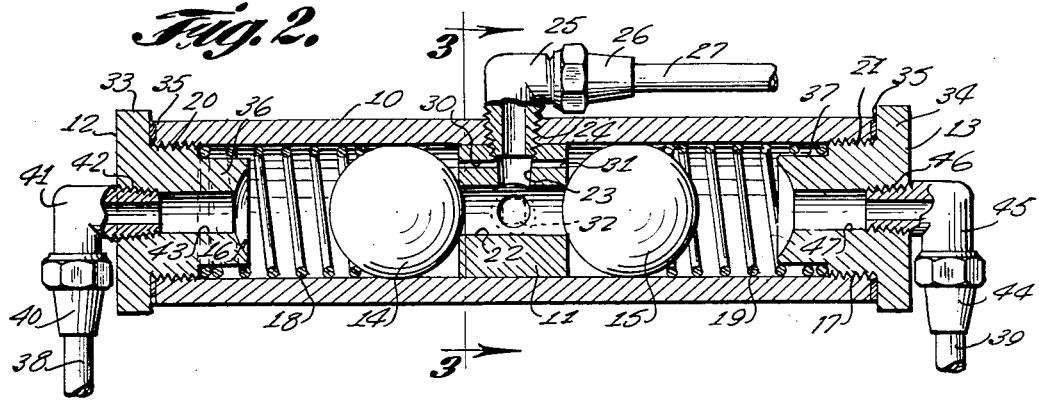
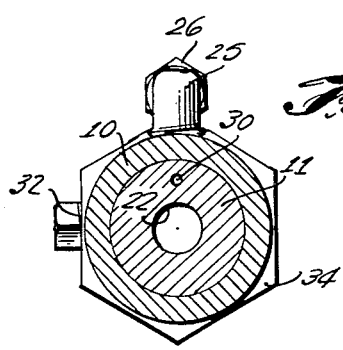
INVENTORS
Cole L. Reese &
Louis Straus
BY Victor J. Evans & Co.
ATTORNEYS United States Patent Office 2,745,252
Patented May 15, 1956

2,745,252

EMERGENCY VALVE CYLINDER FOR HYDRAULIC BRAKE SYSTEMS

Cole Lewis Reese and Louis Straus, Dallas, Tex.; said Reese assignor, by direct and mesne assignments, of twenty-one and one-half per cent to James Henry Stroman, Oklahoma City, Okla., and five per cent to J. Val Connell Application July 30, 1954, Serial No. 446,810

5 Claims. (Cl. 60—54.5)

This invention relates to hydraulic brake systems particularly adapted for motor vehicles, and in particular, a cylinder independently connecting the wheel cylinders of front and rear wheel brakes to a master cylinder whereby should a leak or break occur in either the front or rear portions of the brake system the portion in which the break occurs is shut off whereby the full force of the brake fluid is applied to the other portion of the system.

The purpose of this invention is to obviate the possibility of brake failure by isolating a portion of a fluid brake system in which a leak or break occurs.

In conventional hydraulic brake systems, the master cylinder is connected directly into the system and should a leak occur in a wheel cylinder, or should a break occur in a pipe or part of the system, brake fluid is drained from the entire system and the brakes of a vehicle upon which the system is installed are inoperative. With this thought in mind, this invention contemplates a motor vehicle brake system having an emergency valve cylinder, and the master cylinder is connected to the center of the emergency valve cylinder with each portion of the brake system connected to an end of the cylinder thereby making it possible to provide independently operating check valves between the master cylinder and each portion of the brake system.

The object of this invention is, therefore, to provide a double-acting emergency valve assembly wherein with the master cylinder of a brake system connected to a centrally disposed point of the assembly and with portions of the brake system independently connected to ends of the assembly the portion at either end may be isolated with the portion at the opposite end adapted to operate.

Another object of the invention is to provide an emergency shut-off or check valve assembly for fluid brake systems of motor vehicles in which the device is adapted to be incorporated in brake systems now in use.

Another important object of the invention is to provide an emergency check valve assembly for fluid brake systems whereby a damaged portion of a brake system may be isolated in which by-passes are provided in the valve assembly to permit fluid to pass back to the master cylinder upon continuous pumping of a brake pedal.

A further object of the invention is to provide an emergency valve assembly for isolating a damaged portion of a fluid brake system in which the valve assembly is of a simple and economical construction.

With these and other objects and advantages in view, the invention embodies a cylinder having a spacer with a passage therethrough positioned midway of the length of the cylinder, bushings having bores and also having valve seats at the inner ends of the bores threaded in the ends of the cylinder, balls in the cylinder and positioned on opposite sides of the spacer, springs in the cylinder for urging the balls away from the valve seats of the bushings, a center connection connecting end sections of the cylinder to a master brake cylinder and connections extended through the bushings and adapted to be connected to front and rear portions of a brake system.

Other features and advantages of the invention will appear from the following description taken in connection with the drawing, wherein:

Figure 1 is a plan view illustrating a typical motor vehicle chassis with wheels on axles at the ends and with the emergency cylinder of this invention connected in the brake system of the vehicle.

Figure 2 is a longitudinal section through the emergency valve assembly showing the assembly with the balls of the valves in open or operative positions whereby pressure from the master cylinder is adapted to be transmitted to front and rear portions of a fluid brake system, the parts being shown on an enlarged scale.

Figure 3 is a cross section through the valve assembly taken on line 3—3 of Figure 2, the parts also being shown on an enlarged scale.

Referring now to the drawing wherein like reference characters denote corresponding parts, the improved emergency valve assembly of this invention includes a cylinder 10, a stationary spacer 11 in the cylinder and positioned midway of the length thereof, bushings 12 and 13, threaded in the ends of the cylinder, balls 14 and 15 positioned in opposite ends of the cylinder and adapted to coact with valve seats 16 and 17, respectively, of the bushings 12 and 13, and springs 18 and 19 for urging the balls away from the valve seats.

The cylinder 10, which may be of any suitable length, is threaded internally at the ends, as indicated by the numerals 20 and 21, and the spacer 11 is secured in the center of the cylinder, such as by shrinking or the like. The spacer 11 is provided with a longitudinally disposed bore 22 and a side connection 23 connecting the bore to an opening 24 in the wall of the cylinder 10 into which a fitting 25 is threaded, as shown in Figure 2. The fitting 25 is provided with a coupling 26 that connects a tube 27 to the fitting, the tube 27 connecting the device to a master cylinder 28 of a vehicle chassis 29 as shown in Figure 1. The spacer 11 is also provided with by-pass connections 30 and 31 whereby back pressure resulting from rapid pumping of the brakes is adapted to pass back to the master cylinder.

The cylinder 10 is also provided with a filling plug 32 that provides means for replenishing fluid in the system and this plug may also be used for draining sediment and the like from the cylinder.

The bushings 12 and 13 are provided with flanges 33 and 34 respectively, which, being provided with flat sides, as shown in Figure 3, facilitate inserting and removing the bushings in the threads of the ends of the cylinder. Gaskets 35 are positioned between the ends of the cylinder and flanges 33 and 34.

The inner ends of the bushings are provided with cylindrical sections 36 and 37 in which the valve seats 16 and 17 are positioned, respectively, and with the outside diameters of the sections 36 and 37 being less than the inside diameter of the cylinder 10 annular openings are provided for the ends of the springs 18 and 19.

The springs urge the balls toward the center spacer 11 and when pressure is applied to the brake system by pressing on the foot lever the balls move with the passage of the fluid whereby pressure is transmitted to the wheel brake cylinders; and when a break in a line occurs or when the fluid in a portion of the brake system escapes from the section the pressure against the outer surface of the ball in the portion of the cylinder for supplying fluid pressure to the portion of the brake system in which the break occurs is relieved and the ball is snapped against the seat preventing the escape of the fluid and directing the full force of the pressure into the remaining portion of the brake system.

The ends of the cylinder 10 are connected to front and rear portions of the fluid brake system of a motor vehicle, as shown in Figure 1, with a tube 38 extended to the rear brakes and a tube 39 extended to the brakes of the front wheels and, as illustrated in Figure 2, the tube 38 is connected by a coupling 40 to a fitting 41 that is threaded into a threaded section 42 of a bore 43 of the bushing 12, and the tube 39 is connected by a coupling 44 to a fitting 45 which is threaded into an outer end 46 of a bore 47 of the bushing 13. It is understood that the tubes are connected to conventional wheel cylinders of the brake system by suitable means.

By this means an emergency device is provided whereby with the system operating in the conventional manner fluid under pressure is supplied from the master cylinder through the tube 27 to the interior of the cylinder 10 through the passage 22 in the spacer 11 whereby the balls 14 and 15 move outwardly driving fluid in the ends of the cylinders into the front and rear portions of the brake system whereby brakes are applied to the front and rear wheels; and when fluid is exhausted in either section of the system the pressure is relieved on the opposite or far side of the ball in the connection to that system whereby the ball snaps against the seat closing off the portion of the system and preventing the escape of the brake fluid through the broken connection or leak. At the same time pressure is retained for the other portion of the system whereby the brakes at either the front or rear are adapted to be applied.

It will be understood that modifications, within the scope of the appended claims, may be made in the design and arrangement of the parts without departing from the spirit of the invention.

What is claimed is:

1. An emergency valve assembly for use in a hydraulic brake system of a vehicle, comprising a cylinder, a stationary spacer positioned in said cylinder intermediate the ends thereof and having a longitudinally extending central bore therein, a pair of bushings mounted in the ends of said cylinder and having passages therethrough for connection to wheel cylinders in a hydraulic system, there being a valve seat in the inner portion of each of said bushings, a pair of balls movably mounted in said cylinder for coaction with said valve seats, a pair of coil springs positioned in said cylinder for urging said balls away from said valve seats and into engagement with the bore in said spacer, there being an opening in the wall of said cylinder intermediate the ends thereof, a fitting arranged in threaded engagement with said opening, there being a flaring aperture in said spacer connecting said bore to said fitting, there being aligned passageways in said spacer extending parallel to said central bore and communicating with said aperture, there being another opening in the cylinder wall intermediate the ends of said cylinder, another bore in said spacer in alignment with the said other opening in the cylinder wall and communicating with the central bore in said spacer, a filling plug detachably connected to said other opening in the cylinder wall, the inner ends of said bushings being provided with cylindrical sections of reduced diameter, said reduced diameter sections forming a shoulder and said shoulders having said coil springs arranged in engagement therewith.

2. An emergency valve assembly for use in a fluid pressure brake system comprising a cylinder, a spacer positioned in said cylinder intermediate the ends thereof and having a longitudinally extending bore therein, a pair of bushings mounted in the ends of said cylinder and having passages therethrough for connection to wheel cylinders in a fluid pressure system, there being a valve seat in the inner portion of each of said bushings, a pair of balls movably mounted in said cylinder for coaction with said valve seats, a pair of springs positioned in said cylinder for urging said balls away from said valve seats and into engagement with the bore in said spacer, there being an opening in the wall of said cylinder intermediate the ends thereof, a fitting arranged in threaded engagement with said opening, there being a flaring aperture in said spacer connecting said bore to said fitting, there being aligned passageways in said spacer extending parallel to said bore and communicating with said aperture, there being another opening in the cylinder wall intermediate the ends of said cylinder, another bore in said spacer in alignment with the opening in the cylinder wall and communicating with the bore in said spacer, a filling plug detachably connected to said other opening in the cylinder wall, the inner ends of said bushings being provided with cylindrical sections of reduced diameter, said reduced diameter sections forming a shoulder and said shoulders having said springs arranged in engagement therewith.

3. An emergency valve assembly for use in a fluid pressure brake system comprising a cylinder, a spacer positioned in said cylinder intermediate the ends thereof and having a longitudinally extending bore therein, a pair of bushings mounted in the ends of said cylinder and having passages therethrough for connection to wheel cylinders in a fluid pressure system, there being a valve seat in the inner portion of each of said bushings, a pair of valve bodies movably mounted in said cylinder for coaction with said valve seats, a pair of springs positioned in said cylinder for urging said valve bodies away from said valve seats and into engagement with the bore in said spacer, there being an opening in the wall of said cylinder intermediate the ends thereof, a fitting arranged in threaded engagement with said opening, there being a flaring aperture in said spacer connecting said bore to said fitting, there being aligned passageways in said spacer extending parallel to said bore and communicating with said aperture, there being another opening in the cylinder wall intermediate the ends of said cylinder, another bore in said spacer in alignment with the opening in the cylinder wall and communicating with the bore in said spacer, a filling plug detachably connected to said other opening in the cylinder wall, the inner ends of said bushings being provided with cylindrical sections of reduced diameter, said reduced diameter sections forming a shoulder and said shoulders having said springs arranged in engagement therewith.

4. An emergency valve assembly for use in a fluid pressure brake system comprising a cylinder, a spacer positioned in said cylinder intermediate the ends thereof and having a longitudinally extending bore therein, a pair of bushings mounted in the ends of said cylinder and having passages therethrough for connection to wheel cylinders in a fluid pressure system, there being a valve seat in the inner portion of each of said bushings, a pair of balls movably mounted in said cylinder for coaction with said valve seats, a pair of springs positioned in said cylinder for urging said balls away from said valve seats and into engagement with the bore in said spacer, there being an opening in the wall of said cylinder intermediate the ends thereof, a fitting arranged in threaded engagement with said opening, there being a flaring aperture in said spacer connecting said bore to said fitting, passage means in said spacer establishing communication between the cylinder on opposite sides of the spacer and with said bore, there being another opening in the cylinder wall intermediate the ends of said cylinder, another bore in said spacer in alignment with the opening in the cylinder wall and communicating with the bore in said spacer, a filling plug detachably connected to said other opening in the cylinder wall, the inner ends of said bushings being provided with cylindrical sections of reduced diameter, said reduced diameter sections forming a shoulder and said shoulders having said springs arranged in engagement therewith.

5. An emergency valve assembly for use in a fluid pressure brake system comprising a cylinder, a spacer positioned in said cylinder intermediate the ends thereof and having a longitudinally extending bore therein, a pair of bushings mounted in the ends of said cylinder and having passages therethrough for connection to wheel cylinders in a fluid pressure system, there being a valve seat in the inner portion of each of said bushings, a pair of balls movably mounted in said cylinder for coaction with said valve seats, a pair of springs positioned in said cylinder for urging said balls away from said valve seats and into engagement with the bore in said spacer, there being an opening in the wall of said cylinder intermediate the ends thereof, a fitting arranged in threaded engagement with said opening, there being a flaring aperture in said spacer connecting said bore to said fitting, there being aligned passageways in said spacer extending parallel to said bore and communicating with said aperture, a filling passage member, including a filling plug, extending through the cylinder wall and communicating with the bore in said spacer, the inner ends of said bushings being provided with cylindrical sections of reduced diameter sections forming a shoulder and said shoulders having said springs arranged in engagement therewith.

References Cited in the file of this patent

UNITED STATES PATENTS

| | | |
|---|---|---|
| 1,952,557 | Masteller | Mar. 27, 1934 |
| 1,968,702 | Nall | July 31, 1934 |
| 2,105,748 | McCarty | Jan. 18, 1938 |
| 2,196,919 | Hirschey et al. | Apr. 9, 1940 |
| 2,254,990 | Blank | Sept. 2, 1941 |